Aug. 30, 1966   P. J. IMSE ETAL   3,269,526
CHAIN LINK WITH IMPROVED PIN SECUREMENT
Filed Aug. 28, 1964
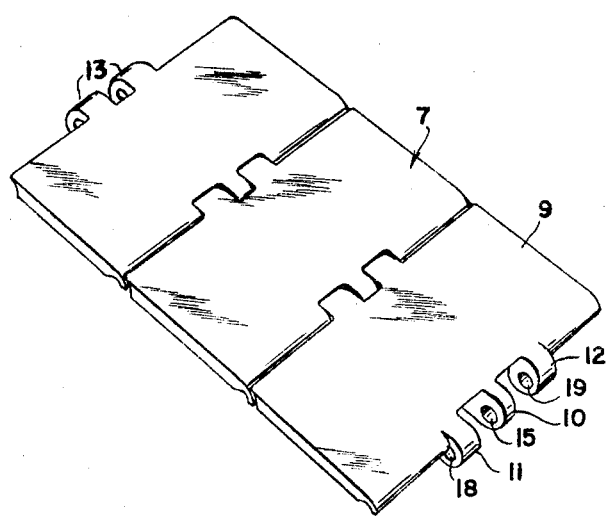
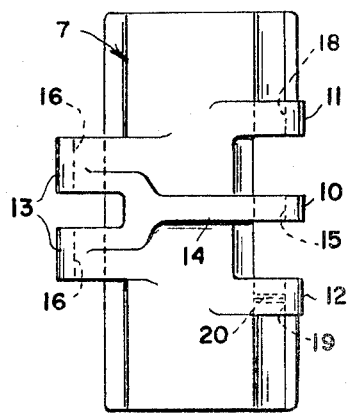
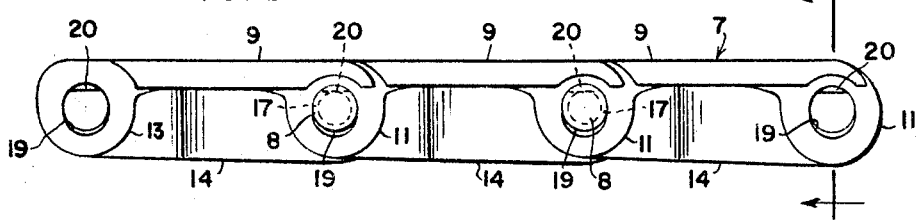
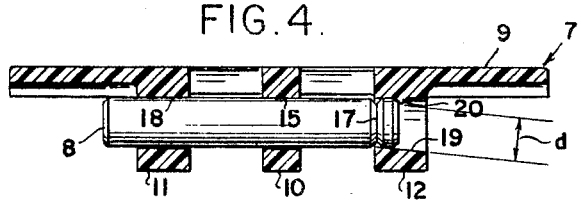
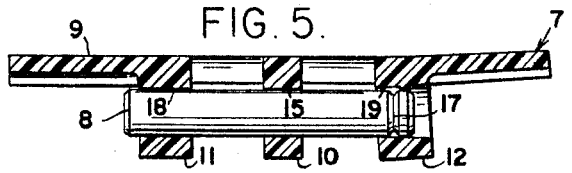
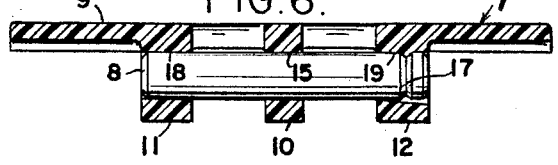

United States Patent Office 3,269,526
Patented August 30, 1966

3,269,526
CHAIN LINK WITH IMPROVED PIN SECUREMENT
Philip J. Imse, Wauwatosa, James W. Leege, Greendale, and Jerome F. Sheldon, Milwaukee, Wis., assignors to Rex Chainbelt Inc., Milwaukee, Wis., a corporation of Wisconsin
Filed Aug. 28, 1964, Ser. No. 392,765
9 Claims. (Cl. 198—189)

This invention relates to chains and particularly to means for securement against endwise movement of the pin which extends through interfitting knuckles of adjacent links of the chain and pivotally connects the same to allow the chain to wrap around and operate over a sprocket.

In the preferred embodiment of the invention, the pin is assembled by insertion in the aligned bores of the interfitting knuckles of two adjacent links until its end contacts the internal projection located in an outer knuckle. Further pushing on the pin will cause the outer knuckle to be angularly deflected until its bore is positioned to allow further insertion of the pin therein. Upon registry of the recess of the pin with the internal projection, the outer knuckle will return to its originally undeflected position; then the pin will be positively secured in the aligned bores of the interfitting knuckle.

The principal object of the invention is to provide an improved positive and releasable securement of the pin without requiring the ends of the pin to project from the link.

Another object of the invention is to provide securement of the pin without an interlocking means which must be first removed to allow removal of the pin from the link.

Another object of the invention is to provide securement of the pin by an interlocking means which is an integral part of the link.

Another object is to provide an improved securement of the connecting pins for conveyor chain oprating in either direction and which allows removal of the pin without special tools or the like.

Another object is to provide securement of the pin in the plastic links without requiring such deformation as would weaken the link or fail to secure the pin after some wearing has occurred.

The drawings furnished herewith illustrate the best mode of carrying out the invention as presently contemplated and set forth hereinafter.

In the drawings:

FIGURE 1 is a perspective view of several connected links of a flat-top conveyor chain;

FIG. 2 is a plan view of the underside of one of the links;

FIG. 3 is an enlarged side elevation of the links shown in FIGURE 1;

FIG. 4 is an enlarged cross-sectional view along the plane indicated by line 4—4 in FIG. 3, and shows the pin in its partially inserted position with its end contacting the internal projection located in the outer knuckle;

FIG. 5 is an enlarged cross-sectional view similar to FIG. 4, and shows the link elastically deformed and the outer knuckle angularly deflected and positioned for further insertion of the pin therein; and FIG. 6 is an enlarged cross-sectional view similar to FIG. 4, and shows the pin in its fully inserted position with the outer knuckle returned to its undeflected position and the internal projection in registry with the recess of the pin providing positive endwise securement of the pin in the knuckle of the link.

As shown in the drawings, the chain comprises a series of elastic, unitary links 7 and metal connecting pins 8 which connect the links for articulation of the chain. Each link 7 is an integrally formed plastic member having a rectangular plate-like body 9 providing with the adjacent links a flat, upper surface to support articles and the like.

The eyes or knuckles of each link include the center knuckle 10 located on the centerline of the link 7, the outer knuckles 11 and 12, and the knuckles 13 which latter interfit the knuckles 10, 11 and 12 of the next adjacent link. The reinforcing rib 14 connecting the knuckles 10 and 13 is integrally formed with the body 9 and extends along the centerline of the link 7 to reinforce the same; it is designed to carry a substantial share of the tension imposed on the chain as described and claimed in United States Patent No. 2,911,091.

The pins 8 are disposed in the several aligned bores or bearings of the interfitting knuckles to form the joints of the chain. The center portion of the pin is supported in the bore or bearing 15 of the knuckle 10, and the size of the bores or bearings 16 of the knuckles 13 allow pin 8 to turn therein and form the live bearing of the chain joint. Each pin has a recess 17 disposed near one end, which end is rounded or tapered. The end portions of pin 8 are carried in the bores or bearings 18 and 19 of the outer knuckles 11 and 12 respectively.

The outer knuckle 12 is formed to include an internal projection 20 which is located in the bore 19 and disposed relatively near the bore opening which is farthest from the centerline of the link 7.

The bore 19 of knuckle 12, excepting projection 20, is defined by the surface generated by moving a cyclinder slightly larger than the diameter of pin 8 from a first position, which corresponds with that the pin in its fully inserted position in the knuckle, to a second position, which corresponds with that of the pin in the knuckle when the latter is angularly deflected as by bending the link in a manner which rotates the knuckle 12 about an axis parallel to the centerline of the link 7 and in a direction away from the centerline of the link. When the pin 8 is in its fully inserted position in the bores of the interfitting knuckles, the bore 19 includes a relief clearance which is directly opposite the projection 20. The bore opening of knuckle 12 nearer the centerline of the link is slightly larger than the diameter of pin 8 and the relief clearance extends therefrom and becomes uniformly larger toward the opposite bore opening. Accordingly, the opposite bore opening referred to above is an elongated hole with its major diameter perpendicular to the link body 9, and its minor diameter is parallel to the link body 9.

Each link 9 is assembled with the next adjacent link by inserting the recessed end of pin 8 in the outer knuckle 11 and pushing the pin through the aligned bores of the interfitting knuckles of the two adjacent links until the rounded or tapered end of the pin engages projection 18, as shown in FIG. 4. The pin is then pushed to cause the link 9 to bend and knuckle 12 to be angularly deflected until the bore 19 is positioned to allow further insertion of pin 8 therein, as shown in FIG. 5. When the knuckle 12 is in the position described above, the cross-section of the bore at the projection, generally represented by dimension $d$ in FIG. 4, must be large enough and disposed to allow the pin 8 to pass therethrough. The pin 8 may then be further inserted until the projection 20 is in registry with the pin recess 17 which allows the knuckle 12 to return to its originally undeflected position and provides positive endwise securement of the pin 8 in the aligned bores of the interfitting knuckles of the chain joint.

The pin recess 17 as shown is a circumferential groove but may instead extend partially around the circumference of the pin when securement of the pin against rotation in knuckles 11 and 12 is desired. The pin may also be provided with similar recesses at both ends to allow insertion of either end of the pin for assembly of adjacent links as described.

The method of assembling the pin 8 in the aligned bores of the interfitting knuckles may include manually bending of the link to produce the link configuration shown in FIG. 5. Then the pin 8 can be inserted in the aligned bores of the interfitting knuckles with relatively little force; upon release of the bending force on the link, registry of the projection 20 with the pin recess 17 will be effected, as shown in FIG 6.

The pin 8 can be removed by pushing or pounding it out of the aligned bores of the interfitting knuckles in either direction. However, it is advantageous to remove the pin by pushing or pounding in the direction of insertion, which is toward the knuckle 12 containing the projection 20. Another way of removing the pin from its assembly is to manually bend the link to produce a link configuration shown in FIG. 5. The pin 8 can then be readily removed by pushing it in either direction.

The present invention provides a simple and secure manner of assembly and disassembly of the pin in the aligned bores of the interfitting knuckles requiring only a slight deflection of the knuckle with no objectionable stresses being produced in the link.

We claim:

1. In a link for a chain, said link having a pin and two or more spaced knuckles provided with aligned bores for said pin, one of the outer knuckles having a projection extending radially into the bore thereof around a portion of the circumference of said bore for a distance substantially less than the said entire circumference and having connection to the body of the link allowing said one knuckle to be angularly deflectable with respect to the body of the link, said last named bore being dimensioned and said projection being located to allow insertion of said pin in said bores when said one knuckle is angularly deflected, and a recess in the circumference of said pin disposed to register with said radial projection upon insertion of the pin and to secure the pin in the aligned bores upon return of the knuckle to its undeflected position.

2. In a chain adapted to operate over a sprocket or the like and comprising a series of elastic, unitary links having interfitting knuckles provided with aligned bores and a series of pins inserted therein, means utilizing the angular deflectability of one of the outer knuckles of the interfitting knuckles of two adjacent links to provide the improved securement of the pin in the aligned bores thereof comprising a projection extending radially into the bore of said one knuckle around a portion of the circumference of said bore for a distance substantially less than the said entire circumference, said bore being dimensioned to allow insertion of said pin therein when the knuckle is angularly deflected, and a recess in said pin disposed to register with said radial projection upon such insertion of the pin and secure the pin in the aligned bores upon return of the knuckle to its undeflected position.

3. In a flat-top conveyor chain comprising a series of unitary, plastic links having interfitting knuckles provided with aligned bores, each of said links comprising a rectangular plate-like body having a planar container-supporting upper surface, a series of pins inserted in said aligned bores, means utilizing the angular deflectability of one of the outer knuckles of the interfitting knuckles of two adjacent links to provide the improved securement of the pin in the aligned bores thereof comprising a radial projection extending into the bore of said one knuckle and extending circumferentially of said bore a distance substantially less than the circumference of said bore, said bore being dimensioned to allow insertion of said pin therein when the knuckle is angularly deflected, and a recess in said pin disposed to register with said projection upon said insertion of the pin and secure the pin in the aligned bores upon return of the knuckle to its undeflected position.

4. In a flat-top conveyor chain comprising a series of unitary, plastic links having interfitting knuckles provided with aligned bores, each of said links comprises a rectangular plate-like body having a planar container-supporting upper surface, a series of pins inserted in said aligned bores, means utilizing the angular deflectability of one of the outer knuckles of the interfitting knuckles of two adjacent links to provide the improved securement of the pin in the aligned bores thereof comprising a projection extending radially into the bore of said one knuckle and extending circumferentially of said bore a distance substantially less than the circumference of said bore in the direction away from the body of the link, a portion of said bore opposite said projection being dimensioned to allow insertion of said pin therein when the knuckle is angularly deflected, and a recess in said pin disposed to register with said radial projection upon such insertion of the pin and secure the pin in the aligned bores upon return of the knuckle to its undeflected position.

5. In a flat-top conveyor chain comprising a series of unitary, plastic links having interfitting knuckles provided with aligned bores, each of said links comprising a rectangular plate-like body having a planar container-supporting upper surface, a series of pins inserted in said aligned bores, means utilizing the angular deflectability of one of the outer knuckles of said interfitting knuckles of two adjacent links to provide the improved securement of the pin in the aligned bores thereof comprising a projection extending radially into the bore of said one knuckle and extending circumferentially of said bore a distance substantially less than the distance of said circumference in the direction away from the body of the link and disposed nearer the opening of said bore farther from the centerline of the link, a portion of said bore opposite said projection being dimensioned to allow insertion of said pin therein when the knuckle is angularly deflected in a direction away from the centerline of the link, and a recess in said pin disposed to register with said projection upon such insertion of the pin and secure the pin in the aligned bores upon return of the knuckle to its undeflected position.

6. The invention in claim 5 wherein the pin includes a tapered end which is engageable with the projection as when inserting said pin endwise in the aligned bores of the interfitting knuckles and effects the described angular deflection of said one knuckle until said projection is in registry with the recess of the pin.

7. In a chain comprising a series of unitary links of elastic material having interfitting knuckles provided with aligned bores and connecting pins fitting and inserted endwise through the aligned bores of the interfitted knuckles of two adjacent links to form the joints of the assembled chain, a projection formed integrally with one of the two outer knuckles of the chain joint and extending radially into the bore of said one knuckle and extending circumferentially of said bore a distance substantially less than the circumference of said bore in the direction away from the body of the link and a recess formed in the pin to receive said projection, said bore being dimensioned to provide a clearance on the side of the pin opposite said projection whereby bending of the body of the link tends to spread the outer knuckles and allows angular displacement of said one knuckle which removes the projection from the recess of said pin for its removal from said joint.

8. The invention in claim 7 wherein the pin includes a tapered end which is engageable with the projection as when inserting said pin endwise in the aligned bores of the joint and effects the described angular displacement of said one outer knuckle until said projection is in registry with the recess of said pin.

9. In a flat-top conveyor chain comprising a series of links of elastic material having interfitting knuckles provided with aligned bores and connecting pins fitting and inserted endwise through the aligned bores of the interfitted knuckles of two adjacent links to form the joints of the assembled chain each of said links comprising a generally rectangular plate-like body having a planar container-supporting upper surface, one of the two outer knuckles of the chain joint having a projection extending radially and extending circumferentially of said bore a distance substantially less than the circumference of said bore into the bore of said one knuckle in the direction normal to the body of the link and a recess formed in the pin to receive said projection, said bore being dimensioned to provide a clearance on the side of the pin opposite said projection whereby bending of the body of the link tends to spread the outer knuckles and allows angular displacement of said one knuckle which removes the projection from the recess of said pin for its removal from said joint.

References Cited by the Examiner
UNITED STATES PATENTS 2,911,091  11/1959  Imse _____ 198—189

FOREIGN PATENTS 206,755  5/1955  Australia.

EVON C. BLUNK, *Primary Examiner.*
RICHARD E. AEGERTER, *Examiner.*